(12) United States Patent
Weiss et al.

(10) Patent No.: US 6,663,172 B2
(45) Date of Patent: Dec. 16, 2003

(54) FRAME FOR A VEHICLE SLIDING SUNROOF OR SLIDE-AND-TILT SUNROOF

(75) Inventors: Edgar Weiss, Alzenau (DE); Bardo Imgram, Seligenstadt (DE); Holger Oechel, Frankfurt (DE); Hubert Bachmann, Dannstadt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/238,417

(22) Filed: Sep. 10, 2002

(65) Prior Publication Data

US 2003/0047969 A1 Mar. 13, 2003

(30) Foreign Application Priority Data

Sep. 11, 2001 (DE) .......................................... 101 44 738

(51) Int. Cl.[7] .................................................. B60J 7/057
(52) U.S. Cl. .................................. 296/216.08; 296/223
(58) Field of Search ...................... 296/216.06–216.08, 296/223

(56) References Cited

U.S. PATENT DOCUMENTS

| | | | |
|---|---|---|---|
| 4,422,687 A | * 12/1983 | Kaltz et al. ................. | 296/223 |
| RE34,098 E | * 10/1992 | Schleicher et al. .... | 296/216.08 |
| 5,612,600 A | * 3/1997 | Bratkowski et al. ........ | 296/223 |
| 6,431,644 B1 | * 8/2002 | Nagashima et al. ... | 296/216.08 |

FOREIGN PATENT DOCUMENTS

DE 4330582 * 10/1994

* cited by examiner

*Primary Examiner*—Dennis H. Pedder

(57) ABSTRACT

A frame is provided for vehicle roofs of all usual types, such as sliding sunroofs, slide-and-tilt sunroofs and top ridge sliding sunroofs (spoiler roofs), preferably having a motor drive for the cover that can be moved in relation to a roof opening by means of a cable drive system. The frame assembled from few parts comprises a plastic injection molded front member having cable channels open at the bottom and molded-on corner areas for the fixed attachment of the frame side members guiding the cover on guide rails, the side members preferably being cut to length from continuously cast aluminum profiles. The cable channels open at the bottom, into which the drive cables can easily be laid, are closed by at least one likewise plastic injection molded cover element. A motor mounting plate is provided as separate plastic injection molded part, so that it can be formed with high dimensional accuracy from another plastic particularly suited to the drive requirements. The frame is inexpensive to manufacture and can be easily and rapidly assembled by molding on assembly and positioning aids. Through standardisation of its few parts, particularly the motor mounting plate, the frame can be inexpensively adapted to suit the different requirements of specific vehicles.

20 Claims, 8 Drawing Sheets

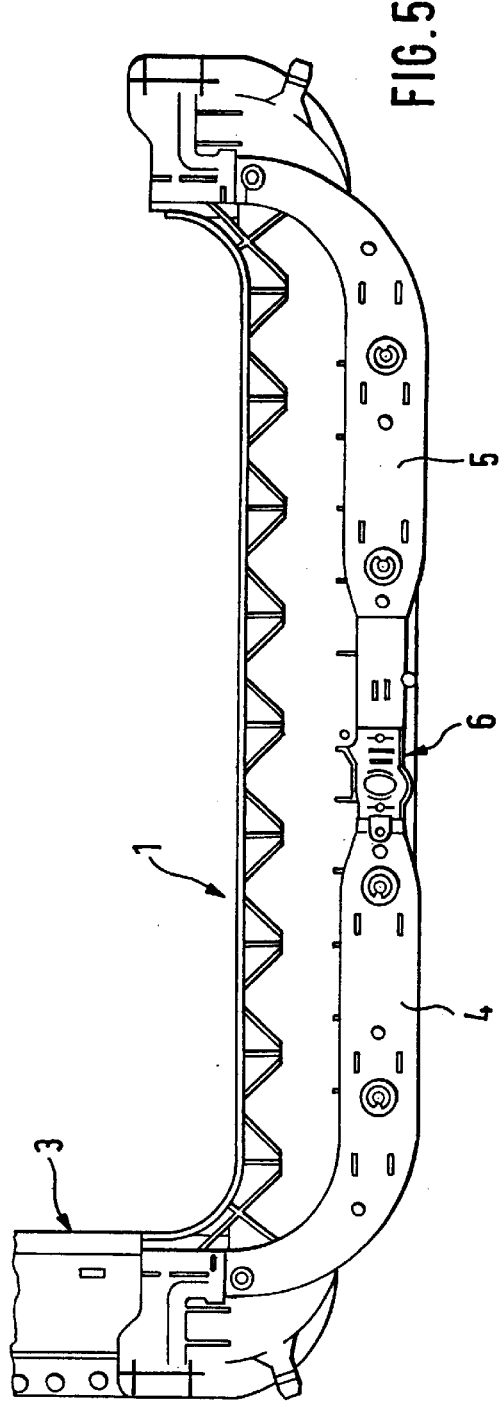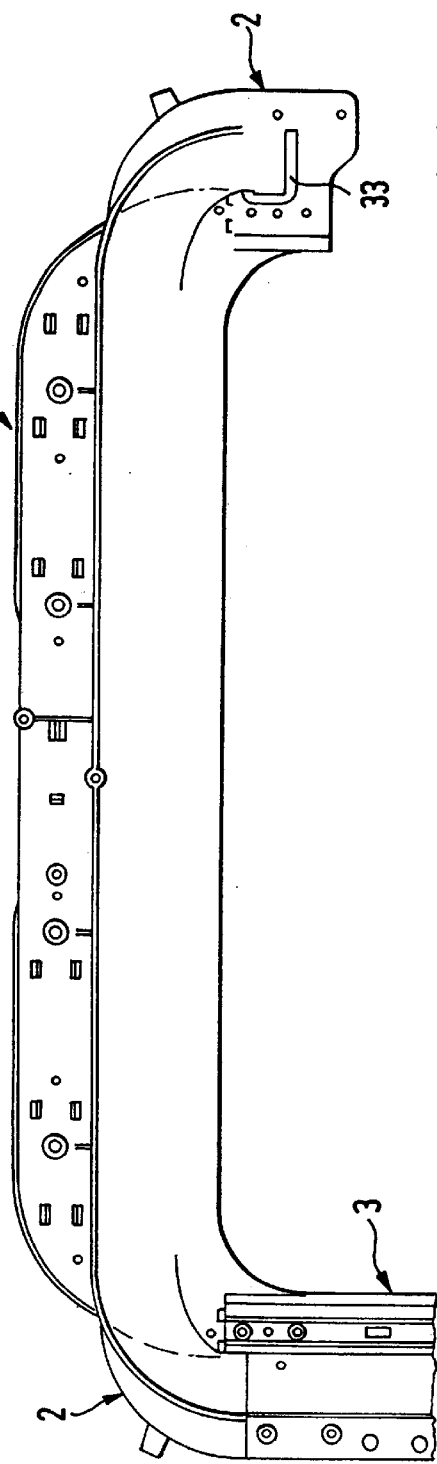

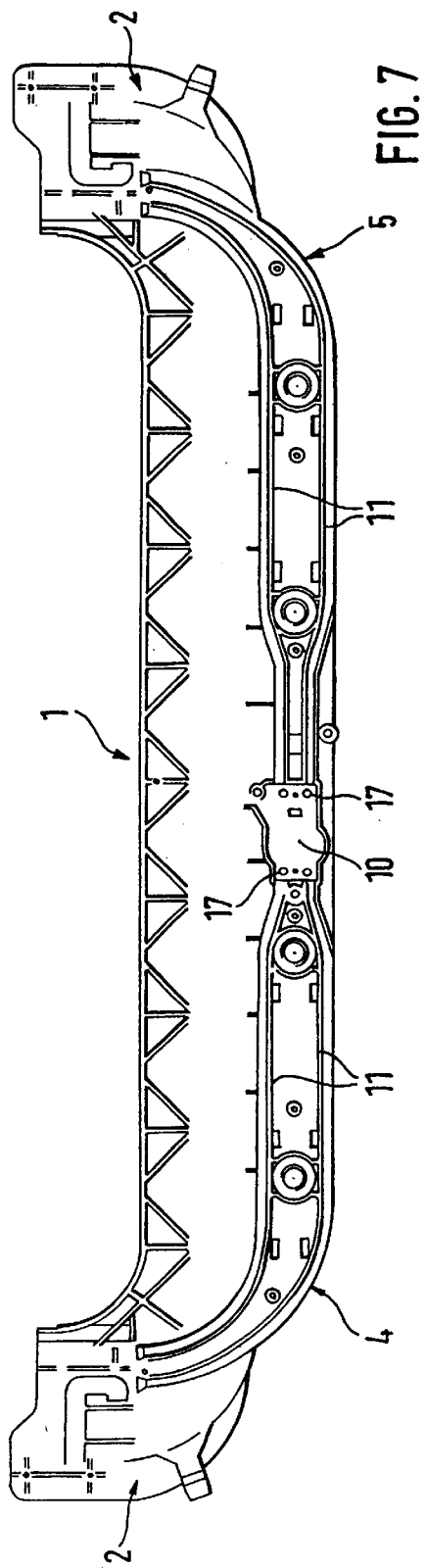
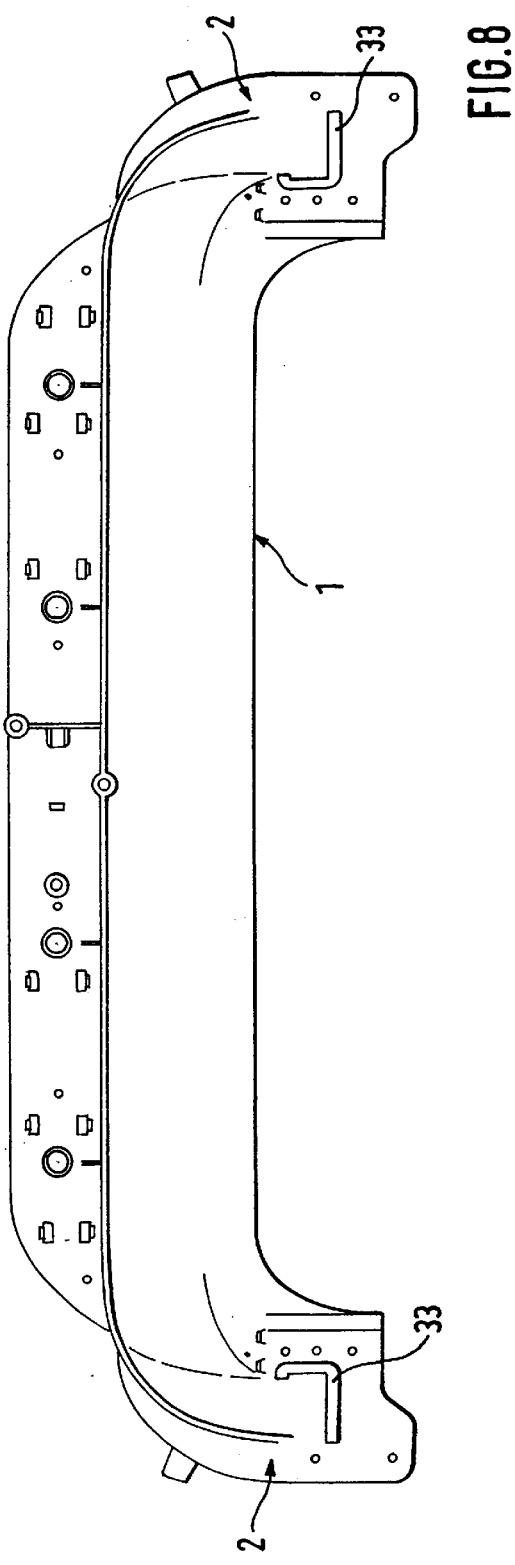

FIG. 9
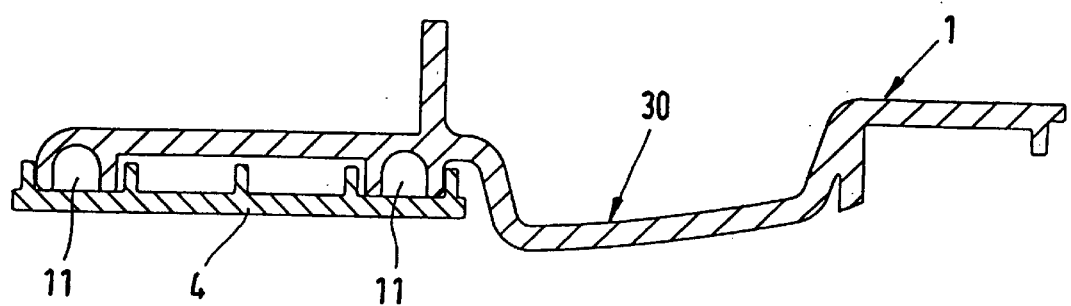
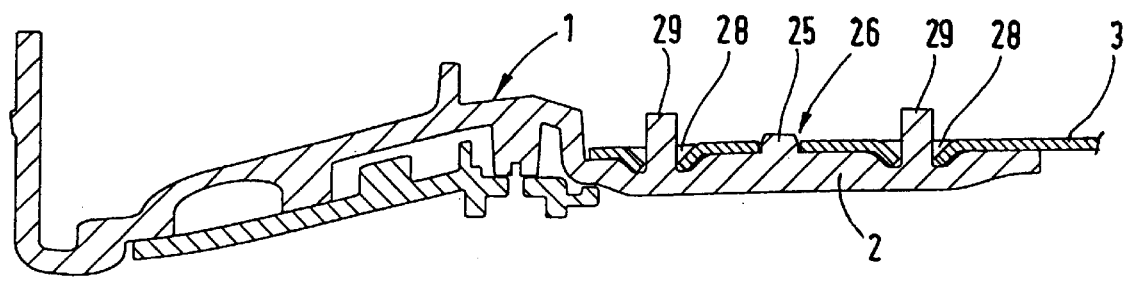
FIG. 10

FIG. 11
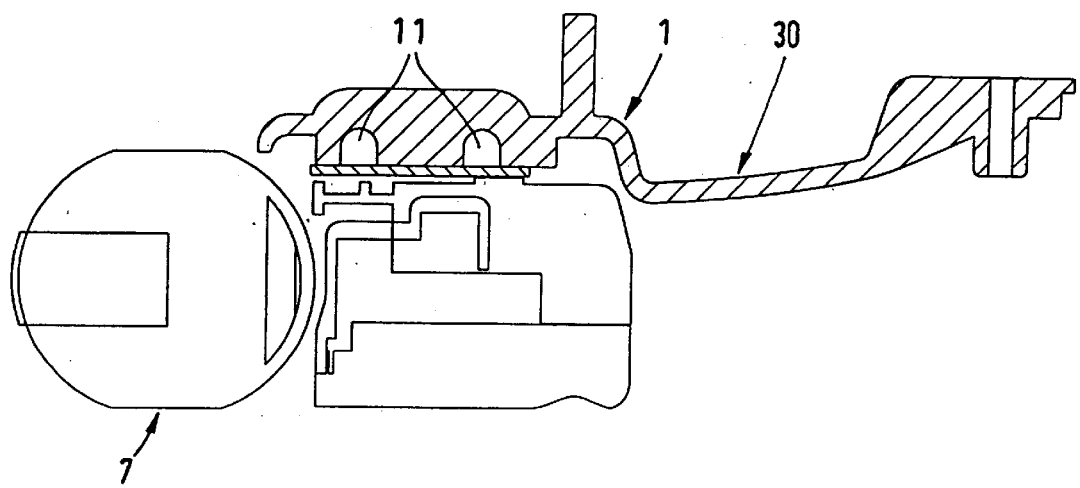
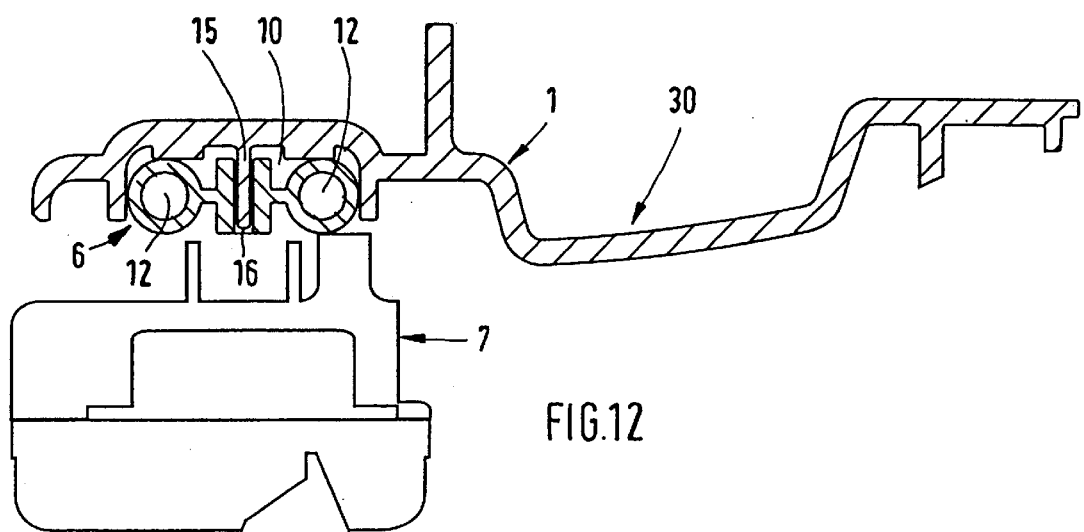
FIG.12

FRAME FOR A VEHICLE SLIDING SUNROOF OR SLIDE-AND-TILT SUNROOF

BACKGROUND OF THE INVENTION

The invention relates to a frame assembled from a plurality of parts for a vehicle sliding sunroof or slide-and-tilt sunroof.

DESCRIPTION OF THE PRIOR ART

In a known frame (DE 40 14 487 C1) of this type the drive cables are displaceably carried in exposed guide tubes outside a plastic injection molded front member. A motor mounting plate is integrally molded on to the front member and extends forwards in the direction of travel as a projection of the front member. In another known frame for a vehicle sliding sunroof (DE 197 46 545 A1), although the drive cables are no longer carried in guide tubes outside the plastic injection molded front member, they are carried inside the front member, partly in slots open at the top and partly in adjoining tubes.

SUMMARY OF THE INVENTION

The object of the invention is to provide a frame of such a type, which can be inexpensively manufactured and assembled from few parts.

According to the present invention, there is provided a frame, assembled from a plurality of parts, for a vehicle sliding sunroof or slide and tilt sunroof, for guiding and mounting a moveable cover assigned to a corresponding roof opening, the frame having a plastic injection molded front member and two side members, arranged parallel to one another and having guide rails for the cover, which side members can be fixed to the front member by way of corner areas molded on to the front member, wherein drive cables for the movement of the cover are provided, which are drive connected to a drive device arranged on the front member by way of a motor mounting plate, and which are displaceably guided on the front member, the corner areas and the side members in a compressive rigid manner; wherein cable channels for the drive cables, open at the bottom, are molded into the front member on both sides of a molded recess for accommodating the motor mounting plate, manufactured as a separate plastic injection molded part, it being possible to close off the said channels by means of cover elements, which are likewise formed as plastic injection molded parts and can be fixed in position to the front member.

In addition to other advantages, manufacturing the motor mounting plate separately as an injection molded plastic part of relatively small dimensions also permits a standardised design for frames of differing types and/or dimensions, whilst adhering to tight dimensional tolerances. Different frames only need a likewise standardised recess in order to accommodate the standard motor mounting plate. Molding in the open cable channels facilitates insertion of the drive cables into the front member and makes it possible to dispense with guide tubes that have to be additionally manufactured and fitted. Like all elements of the front member, the cover elements for the cable channels are also plastic injection molded parts that are inexpensive to manufacture. After fitting to the front member by their inner surfaces, they form bearing and guide surfaces for the drive cables inserted into the cable channels.

Feed-through passages may be provided in the motor mounting plate, into which the two drive cables can be inserted during assembly. Since the feed-though passages tightly enclose the drive cables with displacement travel, no special measures designed to ensure engagement need to be taken at the point of engagement of the drive cables with the drive pinion of the motor, such as the conventional attachment of a spring plate with its associated noise problems.

The feed-through passages in the motor mounting plate are here preferably such that they have their narrowest cross-section at the point of working engagement between the drive cables and the drive pinion. The transitional chamfers or roundings also serve to suppress the generation of noise in drive displacements of the drive cables.

These measures are advantageous in obtaining a precise alignment of the feed-though passages in the motor mounting plate with the adjoining cable channels in the front member of the frame.

The motor-mounting plate and the front member may be equipped with catch elements for prelocating during assembly of the frame and the motor.

The use of a motor mounting plate manufactured separately from the front member permits the advantageous use of plastics with different characteristics for these parts.

After positioning and prelocating of the motor mounting plate on the front member, final assembly of these parts can be suitably undertaken when fitting the motor by bolting the motor to the front member with the motor mounting plate interposed between them.

The cover elements can be fixed to the front member of the frame by a combination of clip elements and screwed connections. This opens up the advantageous possibility, when assembling the frame, of first clipping the cover elements to the front member, before undertaking the screwed connections producing a fixed connection. For this purpose, screws inserted through openings in the cover elements may be screwed directly into the plastic of the front member and/or into threaded bushings injection molded into the front member.

Joining the frame side members to the front member in locations precisely positioned in relation to one another, and fixing these parts of the frame to one another is suitably achieved by the measures, without the need for stamping of the side members for this purpose. For example, the frame side members are laid on the corner areas of the front member from above, positioning being aided by the engagement of positioning projections molded on to the front member with corresponding positioning apertures made in the side members, and are fixed to one another by fasteners. The fasteners are screws introduced through holes in the side members and screwed into the front member and/or hot rivet projections formed on to the front member and led through holes in the side members.

Since, as is usual in frames of this type, the front member and the side members are provided with water channels, via which any water getting into the sliding sunroof construction is drained off, these frame members must be sealed off from one another. This is advantageously achieved by means of the sealing channels, which are molded into the front member and can be filled with a sealant, the sealant being suitably delivered through the holes in the side members.

BRIEF DESCRIPTION OF THE DRAWINGS

Further particulars of the invention are explained in more detail below with reference to the examples of embodiment represented, partially in schematic form, in the drawings, in which:

FIG. 5 shows the front member, viewed from beneath, with cover elements fitted, prelocated motor mounting plate, as yet without motor, and the left-hand side member, viewed in the direction of travel and represented in truncated form, FIG. 6 shows the top view of the arrangement shown in FIG. 6, FIG. 7 shows the view of the front member from beneath, without cover elements and without motor plate, FIG. 8 shows the top view of the front member according to FIG. 7, FIG. 9 shows the section along the line of section IX—IX in FIG. 2, FIG. 10 shows the section along the line of section X—X in FIG. 2, FIG. 11 shows the section along the line of section XI—XI in FIG. 2, FIG. 12 shows the section along the line of section XII—XII in FIG. 2.

DESCRIPTION OF THE PREFERRED EMBODIMENTS

Figure 1:
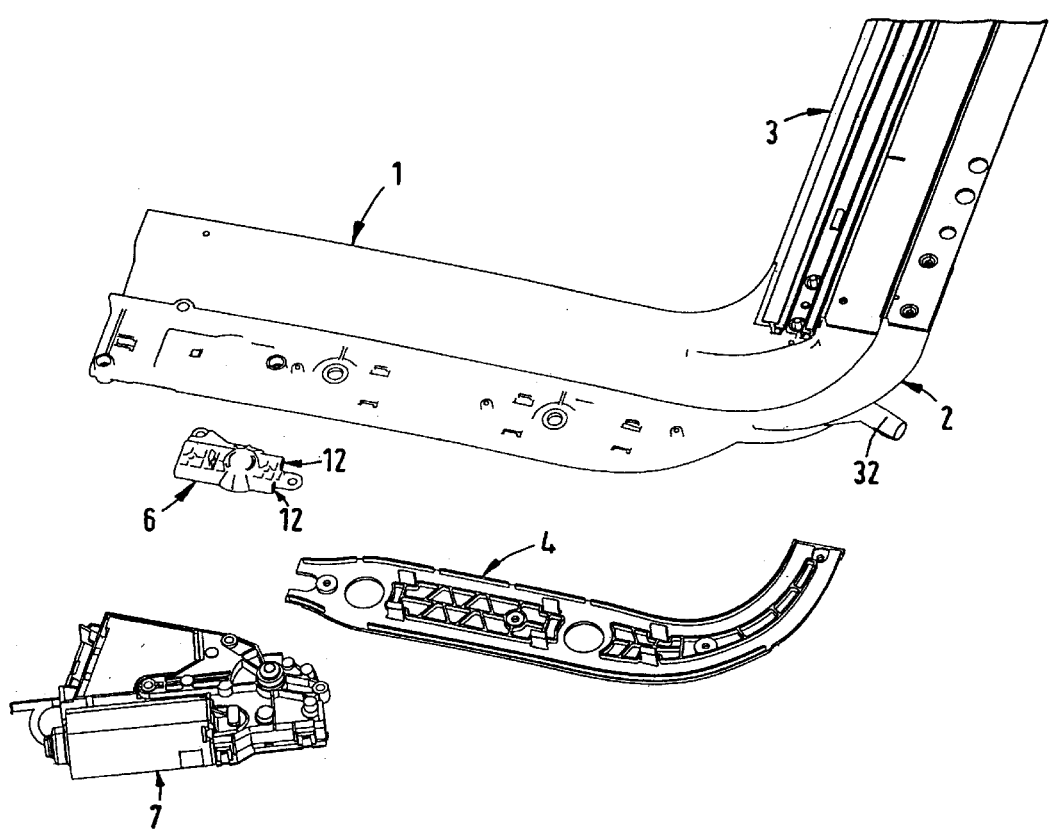
FIG. 1 shows an exploded, perspective representation of the front, left-hand corner of the frame, viewed in the direction of travel, shown with front member and left-hand side member truncated.

FIG. 1 shows the components of the frame. Represented in a figure are the truncated front member 1 with left-hand corner area 2, viewed in the direction of travel (the right-hand corner area is of laterally inverted design, as can be seen, for example, from FIG. 8), the truncated, left-hand side member 3 supported on the corner area 2 (the right-hand side member is of laterally inverted design), the left-hand cover element 4 (the laterally inverted right-hand cover element 5 can be seen from FIG. 7), the motor mounting plate 6 and the electric geared motor 7.

The front member 1, the cover elements 4, 5 and the motor mounting plate 6 are in each case injection molded from suitable plastics, it being possible to use different plastics for the individual parts, depending on the load stresses. Thus, for example, the motor mounting plate 6 can be manufactured from a higher-strength plastic, especially one with a higher abrasion resistance, than the other parts. The plastic used for the motor mounting plate 6 may also be reinforced by carbon fibers. As the drawings reveal, the plastic injection molded parts may be suitably ribbed in order to increase the rigidity, thereby also permitting relatively small wall thicknesses.

Figure 13:
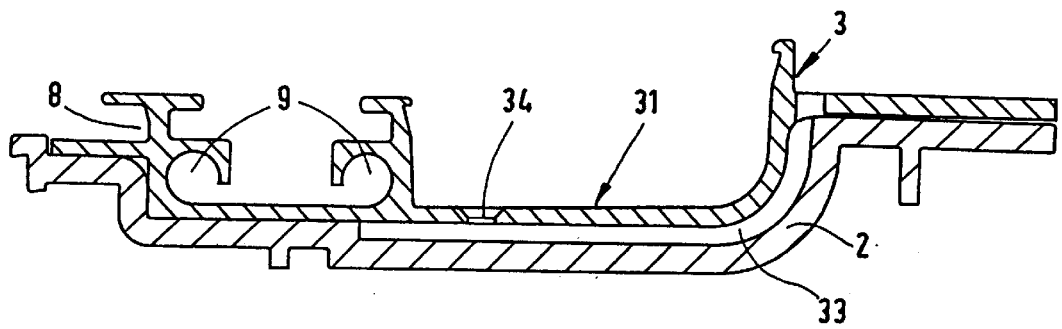
FIG. 13 shows the section along the line of section XIII—XIII in FIG. 2.
Figure 14:
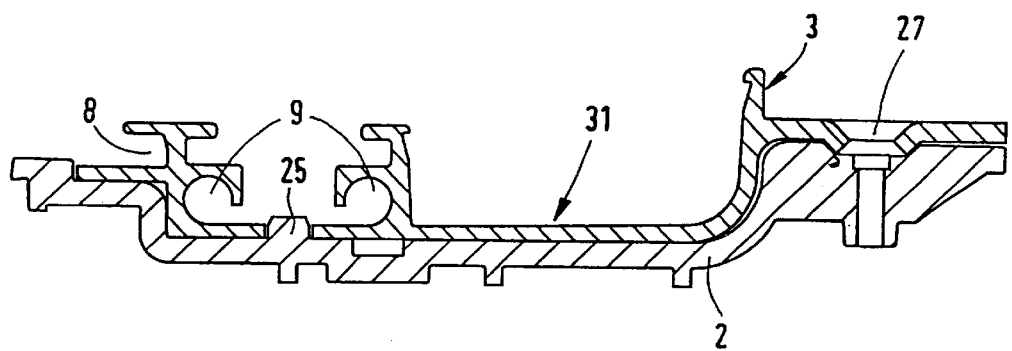
FIG. 14 shows the section along the line of section XIV—XIV in FIG. 2.

The side members 3 of the frame, continuously extruded from a suitable aluminum alloy and cut to the requisite length, for example, form guide rails 8 for the moveable cover (not shown) of the roof construction and, as FIGS. 13 and 14 illustrate, have cable guide channels 9 for flexible drive cables (not shown), afforded compressive rigidity and displaceably carried therein, for driving the moveable cover.

Figure 15:
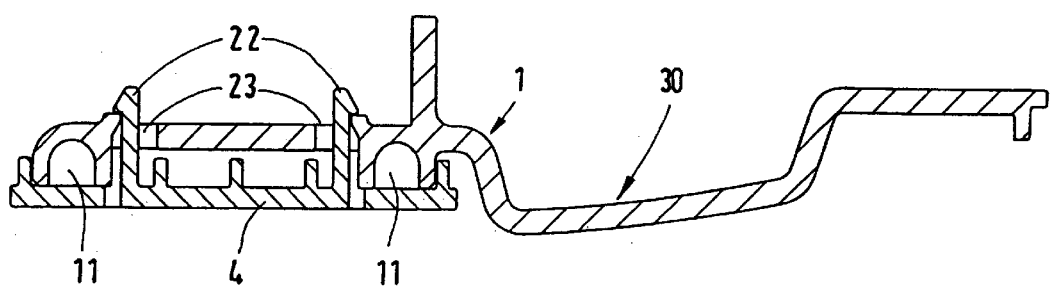
FIG. 15 shows the section along the line of section XV—XV in FIG. 2.
Figure 16:
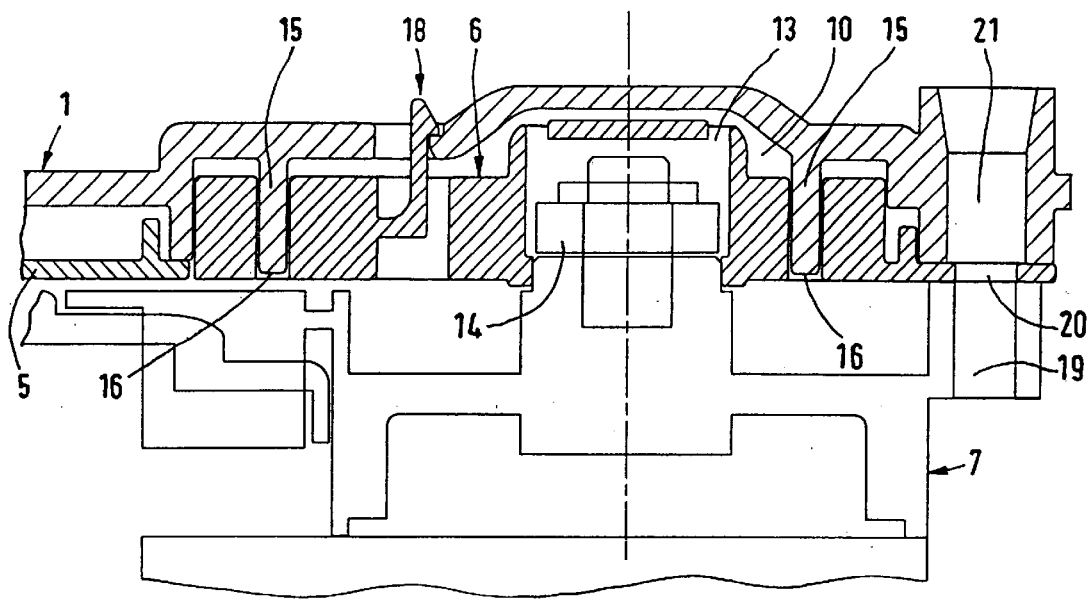
FIG. 16 shows the truncated section along the line XVI—XVI in FIG. 4.
Figure 17:
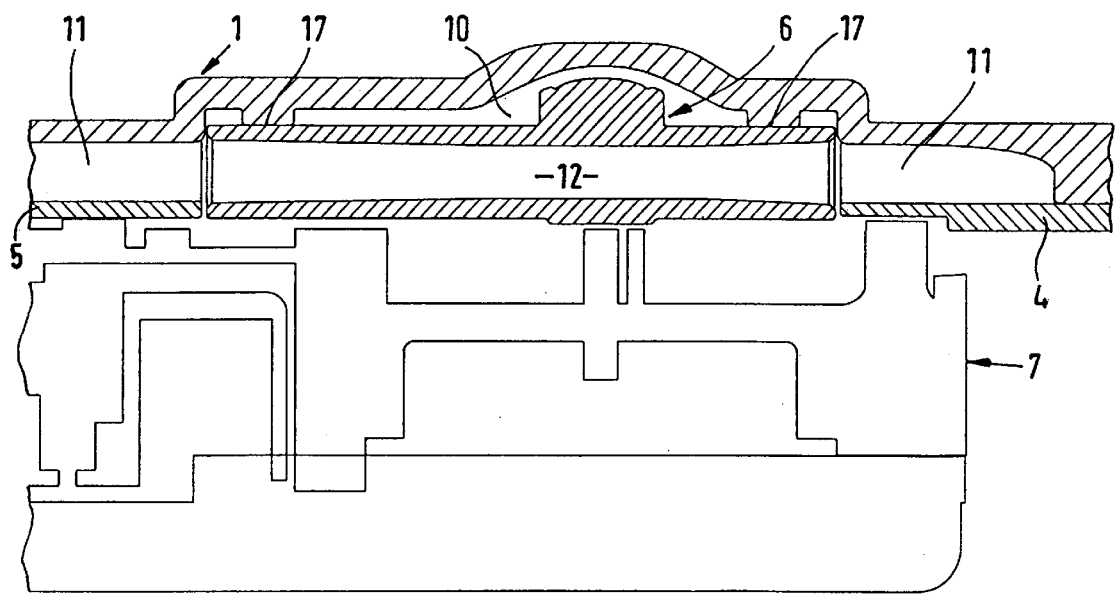
FIG. 17 shows the truncated section along the line XVII—XVII in FIG. 4.

Cable channels 11, open at the bottom, for the accommodation of flexible drive cables, afforded compressive rigidity and guided therein, are molded into the front member 1 on both sides of a recess 10, which is best seen from FIG. 7 but is also visible from FIGS. 12, 16, and 17, molded in for the accommodation of the motor mounting plate 6. After inserting the drive cables, the cable channels 11 are closed by the two cover elements 4, 5 to be fixed in position, as can be seen from FIG. 5 in conjunction with FIGS. 9, 11 and 15.

The motor mounting plate 6 has two axially parallel feed-through passages separated by a distance from one another, only one of which is represented in FIG. 17, and which are indicated in FIG. 1 by the channel openings visible on one side. After fitting the motor mounting plate 6 in the recess 10 of the front member 1, the feed-through passages 12 align steplessly with the cable channels 11. Starting from a central recess 13 in the motor mounting plate 6 for the drive pinion 14, represented schematically in FIG. 16, opposing passage openings (not shown) are provided in the wall areas of the motor mounting plate 6 between the feed-though channels 12 and the central recess 13, the openings serving for engagement of the drive pinion 14 with the drive cables. The drive cables are drive connected to the moveable cover of the roof construction. The drive pinion 14 has an external toothing, by means of which it is in meshing tooth engagement with the two drive cables, as with a toothed rack. The motor 7 may drive the drive pinion 14 either in one direction of rotation or the other, thereby producing opposite displacements of the two drive cables 16. This drive system has been used for sliding sunroof drives for some decades now and therefore does not require further explanation here.

As can be seen from the example of the one feed-through passage 12 shown in FIG. 17, the feed-through passages 12 have a circular cross-section, constantly decreasing from the ends of the channels to the point of engagement with the drive pinion 14, which at its narrowest point is only larger by a displacement play than the outside diameter of the drive cables. This ensures that the drive cables cannot escape from the pinion under the action of the tooth pressure, but are supported by the relevant wall areas of the feed-through passages 12. The feed-through passages 12 are each provided at both ends with transitional chamfers or roundings, as is indicated in FIG. 17. Similar transitional chamfers or roundings are provided on the adjacent inlets and outlets of the cable channels 11 and also on the adjacent edges of the cover elements 4, 5.

Paired positioning projections 15 and positioning apertures 16 are provided in the recess 10 for the accommodation of the motor mounting plate 6 and on the motor mounting plate 6 itself, for precise alignment of the feed-through passages 12 of the motor plate 6 with the adjoining cable channels 11 of the front member 1, as can be seen from FIGS. 12 and 16. In order to produce a defined multi-point support for the motor mounting plate 6, spaced, projecting bearing surfaces 17, two of which are shown in FIG. 17, are provided in the recess 10. In the example of embodiment according to FIG. 7, four bearing surfaces 17 are provided. The bearing surfaces 17 ensure a precise level of the feed-though passages 12 in relation to the adjoining cable channels 11. Altogether, the measures described serve to obtain stepless transitions between the feed-through passages 12 and the adjoining cable channels 11 and hence silent displacements of the drive cables.

In the area of the recess 10 for the motor mounting plate 6, the motor mounting plate 6 and the front member 1 are equipped with catch elements 18 for pre-locating of the motor mounting plate 6 on the front member 1, as FIG. 16 illustrates. For final connection of the front member 1 to the motor 7, the motor 7 is bolted to the front member 1 at a plurality of points with the motor mounting plate 6 interposed between them, as is shown by the example of one of these points in FIG. 16. For this purpose, the motor 7, the motor mounting plate 6 and the front member 1 are provided with congruent holes 19, 20 and 21 respectively.

Figure 2:
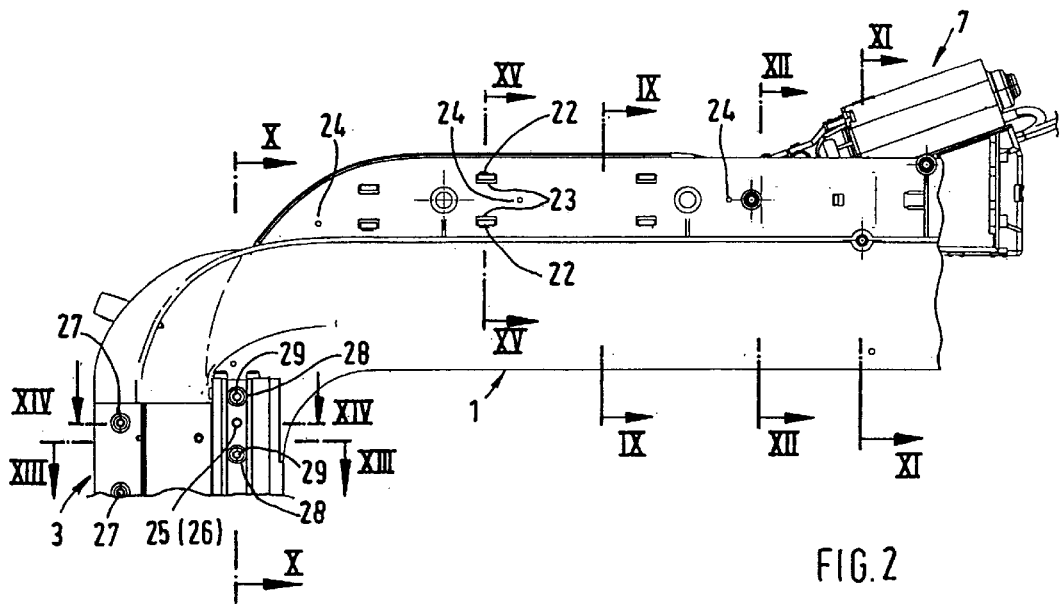
FIG. 2 shows the top view, viewed in the direction of travel, of the front, left hand corner of the finally assembled frame, shown in truncated form.
Figure 3:
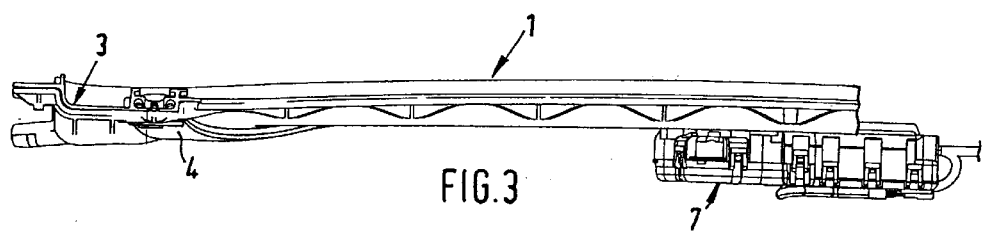
FIG. 3 shows the frame viewed from behind.
Figure 4:
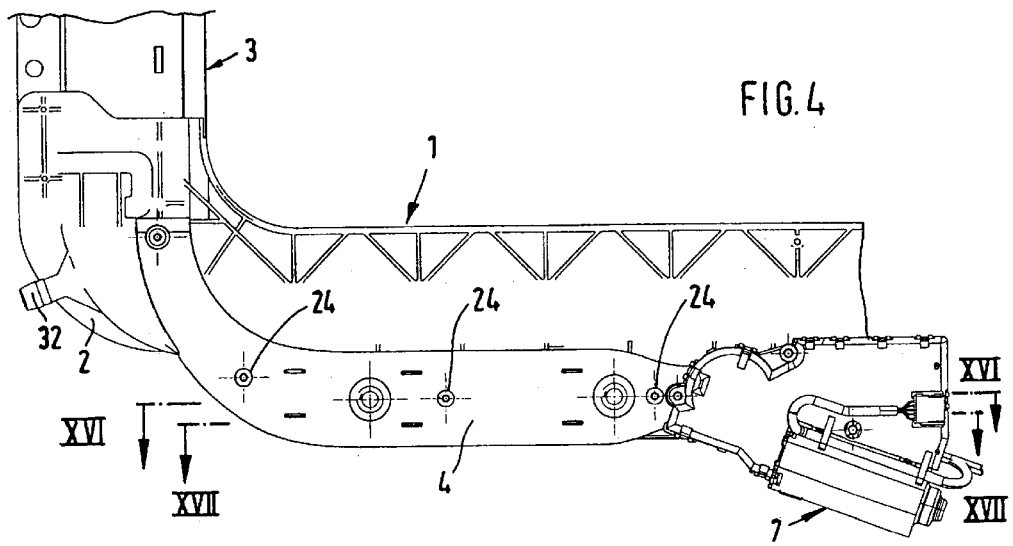
FIG. 4 shows the frame corner shown in FIG. 2, viewed from beneath.

The cover elements 4, 5 are fixed to the front member 1 by a combination of spaced clip elements and screwed connections. The clip elements comprise projections 22 and assigned receiving slots 23, as shown in FIG. 2 in conjunction with FIG. 15, for example. The screwed connections 24 can be seen, for example, from FIGS. 2 and 4.

The side members 3 are laid on the corner areas 2 of the front member 1 from above, positioning projections 25 molded on to the front member 1 engaging with positioning apertures 26 made in the side members 3, in order to produce the desired, precise relative position of side members 3 and front member 1, as can be seen from FIGS. 2 and 10. Fasteners ensure a final connection of these parts 1, 3. In the example shown, fasteners are provided on the one hand in the form of screws (not shown), which are screwed into the front member 1 or its corner areas 2 through holes 27 in the side members 3 (FIGS. 2, 14), and on the other hand in the form of hot rivet projections 29 of the corner areas 2 (FIGS. 2, 10) passed through holes 28 in the side members 3. By heating and exerting pressure on the hot rivet projections 29, these are deformed and riveted in the holes 28.

Both the front member 1 and the side members 3 are equipped, in the manner usual for such frames, with interconnecting water channels 30 and 32 open at the top, as can be seen, for example, from FIGS. 11 and 13. The water collecting in the water channels 30, 31 is drained off via pipe connections 32 (e.g. FIG. 1) fitted in the corner areas 2. Because of this water ducting, the front member 1 and the side members 3 must be sealed off from one another, which according to the example of embodiment shown is achieved by forming a sealing channel 33 in each of the front member/corner areas where the side members 3 bear on the front member 1 or on the corner areas 2 of the front member 1, as can be seen from FIG. 8 in conjunction with FIG. 13. These sealing channels 33 can be filled with an initially fluid sealant or an adhesive. The sealant/adhesive can be delivered to the sealing channels 33 through holes 34 in the side members 3, as FIG. 13 clearly shows. The sealant or the adhesive completely fills the sealing channels and in so doing settles imperviously on all wall surfaces defining the sealing channels.

In summary a frame is proposed for vehicle roofs of all usual types, such as sliding sunroofs, slide-and-tilt sunroofs and top ridge sliding sunroofs (spoiler roofs), preferably having a motor drive for the cover that can be moved in relation to a roof opening by means of a cable drive system. The frame assembled from just a few parts comprises a plastic injection molded front member having cable channels open at the bottom and molded-on corner areas for the fixed attachment of the frame side members guiding the cover on guide rails, the side members preferably being cut to length from continuously cast aluminum profiles. The cable channels open at the bottom, into which the drive cables can easily be laid, are closed by at least one likewise plastic injection molded cover element. A motor mounting plate is provided as separate plastic injection molded part, so that it can be formed with high dimensional accuracy from another plastic particularly suited to the drive requirements. The frame is inexpensive to manufacture and can be easily and rapidly assembled by molding on assembly and positioning aids. Through standardisation of its few parts, particularly the motor mounting plate, the frame can be inexpensively adapted to suit the different requirements of specific vehicles.

I claim:

1. A frame for guiding and mounting a moveable cover of a vehicle roof comprising:
   a front member having two corner areas, a recess and cable channels on each side of the recess being open on one side for receiving drive cables such that the cables are guided on the front member and the corner areas;
   two side members arranged parallel to one another and supported by the corner areas, said side members for receiving the drive cables and including guide rails the cover;
   a motor mounting member that is received at least partially in the recess for supporting a drive device; and
   plastic cover elements connected to the front member to close off said channels.

2. The frame of claim 1, wherein the front member, motor mounting member and the cover elements each comprise injection molded plastic.

3. The frame according to claim 1, wherein said motor mounting member includes two parallel feed-through passages which interfit with said channels when said motor mounting member is received in said recess.

4. The frame according to claim 3, wherein said motor mounting member includes a central drive recess for receiving a drive pinion of the drive device, and wherein said feed-through passages allow the drive cables to be driven by the pinion.

5. The frame according to claim 4, wherein said feed-through passages have circular cross-sections constantly decreasing from the ends of said channels furthest from said drive recess to said drive recess such that corresponding inside portions of said feed-through passages are for supporting the drive cables for engagement with the pinion during movement of the cover.

6. The frame according to claim 3, wherein said feed-through passages are each provided at both ends with transition portions, to which similar transition portions at adjacent inlets of said cable channels and said cover elements correspond such that said drive cables may run throughout said front member, said side elements and said corner areas.

7. The frame according to claim 3, wherein said motor mounting member includes positioning apertures and said front member includes positioning projections that are at least partially received in said positioning apertures thereby aligning said motor mounting member with said front member within said recess while also aligning said feed-through passages with adjoining portions of said cable channels.

8. The frame according to claim 1, wherein said side members further include side member positioning apertures and said front member further includes side member positioning projections that are at least partially received in said side member positioning projections thereby aligning said side members with said front member when said side members are positioned against said corner areas of said front member from above.

9. The frame according to claim 1, including fasteners passing at least partially through said side members to fasten said side members to said front member.

10. The frame according to claim 9, wherein said fasteners comprise hot rivet projections.

11. The frame according to claim 1, wherein said frame includes sealing channels molded into said front member, said sealing channels for receiving a sealant to seal the side members off from the front member.

12. The frame according to claim 1, wherein said front member and said motor mounting member are injection molded from different plastics, the plastic used for said motor mounting member having a comparatively higher strength.

13. The frame according to claim 12, wherein said motor mounting member is formed from plastic reinforced by carbon fibers.

14. An assembly for guiding and mounting a moveable cover of a vehicle roof comprising:

a front member having two corner areas, a recess and cable channels on each side of said recess, said channels being open on one side;

two side members arranged parallel to one another and supported by said corner areas, said side members including guide rails adapted to guide the cover;

drive cables displaceably guided on said front member, said side members and said corner areas, wherein said drive cables fit at least partially within the openings in said cable channels;

a motor mounting member that is received at least partially within said recess;

a drive device connected to said motor mounting member and said drive cables for driving movement of the cover; and plastic cover elements connected to the front member to close off said channels.

15. The assembly according to claim 14, wherein said motor mounting member includes two parallel feed-through passages which interfit with said channels when said motor mounting member is received in said recess.

16. The assembly according to claim 15, wherein said motor mounting member includes a central drive recess adapted to receive a drive pinion of the drive device, and wherein said feed-through passages allow the drive cables to be driven by the pinion.

17. The assembly according to claim 16, wherein said feed-through passages have circular cross-sections constantly decreasing from the ends of said channels furthest from said drive recess to said drive recess such that corresponding inside portions of said feed-through passages are adapted to support the drive cables for engagement with the pinion during movement of the cover.

18. The assembly according to claim 14, wherein said front member and said motor mounting member are injection molded from different plastics, the plastic used for said motor mounting member having a comparatively higher strength.

19. The assembly according to claim 18, wherein said motor mounting member is formed from plastic reinforced by carbon fibers.

20. The assembly according to claim 14, wherein hot rivet projections pass at least partially through said side members and to fasten said side members to said front member.

* * * * *

UNITED STATES PATENT AND TRADEMARK OFFICE
CERTIFICATE OF CORRECTION

PATENT NO. : 6,663,172 B2
DATED : December 16, 2003
INVENTOR(S) : Weiss et al.

It is certified that error appears in the above-identified patent and that said Letters Patent is hereby corrected as shown below:

<u>Column 6,</u>
Line 21, please insert -- for guiding -- after "rails" and before "the"

<u>Column 8,</u>
Line 29, please delete "and" before "to"

Signed and Sealed this

Sixteenth Day of March, 2004

JON W. DUDAS
*Acting Director of the United States Patent and Trademark Office*